United States Patent
Chatman et al.

(10) Patent No.: US 11,138,674 B2
(45) Date of Patent: Oct. 5, 2021

(54) UTILIZING MACHINE LEARNING MODELS TO AUTOMATICALLY PERFORM ACTIONS THAT MAINTAIN A PLAN FOR AN EVENT

(71) Applicant: Capital One Services, LLC, McLean, VA (US)

(72) Inventors: Ljubica Chatman, McLean, VA (US); Michael Mossoba, McLean, VA (US); Abdelkadar M'Hamed Benkreira, McLean, VA (US); Joshua Edwards, McLean, VA (US); Tyler Maiman, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 2 days.

(21) Appl. No.: 16/523,087

(22) Filed: Jul. 26, 2019

(65) Prior Publication Data
US 2020/0265525 A1     Aug. 20, 2020

Related U.S. Application Data

(63) Continuation of application No. 16/280,675, filed on Feb. 20, 2019, now Pat. No. 10,410,294.

(51) Int. Cl.
*G06Q 40/00* (2012.01)

(52) U.S. Cl.
CPC .................. *G06Q 40/12* (2013.12)

(58) Field of Classification Search
CPC ........ G06Q 40/12; G06Q 10/02; G06Q 50/14; G06Q 30/02; G06Q 30/0207; G06Q 20/10;
(Continued)

(56) References Cited

U.S. PATENT DOCUMENTS

2008/0245854 A1   10/2008  Monden
2010/0153298 A1*   6/2010  Fulshaw ............... G06Q 10/10
                                                       705/36 R
(Continued)

OTHER PUBLICATIONS

Co-pending U.S. Appl. No. 16/280,675, filed Feb. 20, 2019.
(Continued)

*Primary Examiner* — Timothy X Pham
(74) *Attorney, Agent, or Firm* — Harrity & Harrity, LLP

(57) ABSTRACT

A device receives, from a user device, plan information that identifies a plan for an event and includes information identifying an account associated with the plan, plan items of the plan, and priorities and preferences associated with the plan items, where the user device is associated with a user of the account and the plan. The device receives transaction information identifying transactions associated with the account, and processes the plan information and the transaction information, with a first model, to identify transactions related to the plan. The device processes information associated with the particular plan item, the plan information, and the transaction information, with a second model, to determine recommendations for the plan, where the information associated with the particular plan item includes information identifying a priority and a preference associated with the particular plan item. The device provides information indicating the recommendations to the user device.

20 Claims, 12 Drawing Sheets

(58) Field of Classification Search
CPC ............... G06Q 30/0224; G06Q 30/06; G06Q 30/0627; G06Q 30/0631; G06Q 50/01; G06Q 10/025; G06Q 10/101; G06Q 20/384; G06Q 20/405; G06Q 30/0201; G06Q 30/0206; G06Q 30/0251; G06Q 30/0255; G06Q 30/0261; G06Q 30/0601
See application file for complete search history.

(56) References Cited

U.S. PATENT DOCUMENTS

| | | | |
|---|---|---|---|
| 2010/0257003 A1* | 10/2010 | Fredericks | G06Q 10/025 |
| | | | 705/6 |
| 2015/0134511 A1* | 5/2015 | Ghosh | G06Q 40/12 |
| | | | 705/39 |
| 2015/0294385 A1 | 10/2015 | Grigg et al. | |
| 2016/0148317 A1 | 5/2016 | Benway et al. | |
| 2016/0267595 A1 | 9/2016 | Rauls et al. | |
| 2017/0193604 A1 | 7/2017 | Johansen et al. | |
| 2020/0111184 A1* | 4/2020 | Ly | G06Q 30/0255 |
| 2020/0211059 A1* | 7/2020 | Joglekar | G06Q 50/14 |
| 2020/0357069 A1* | 11/2020 | Berd | G06Q 40/025 |

OTHER PUBLICATIONS

Intuit Mint., "Manage Your Money Like Never Before," Dec. 19, 2016, 3 pages. Retrieved from Internet: [URL: https://www.mint.com/how-mint-works].

* cited by examiner

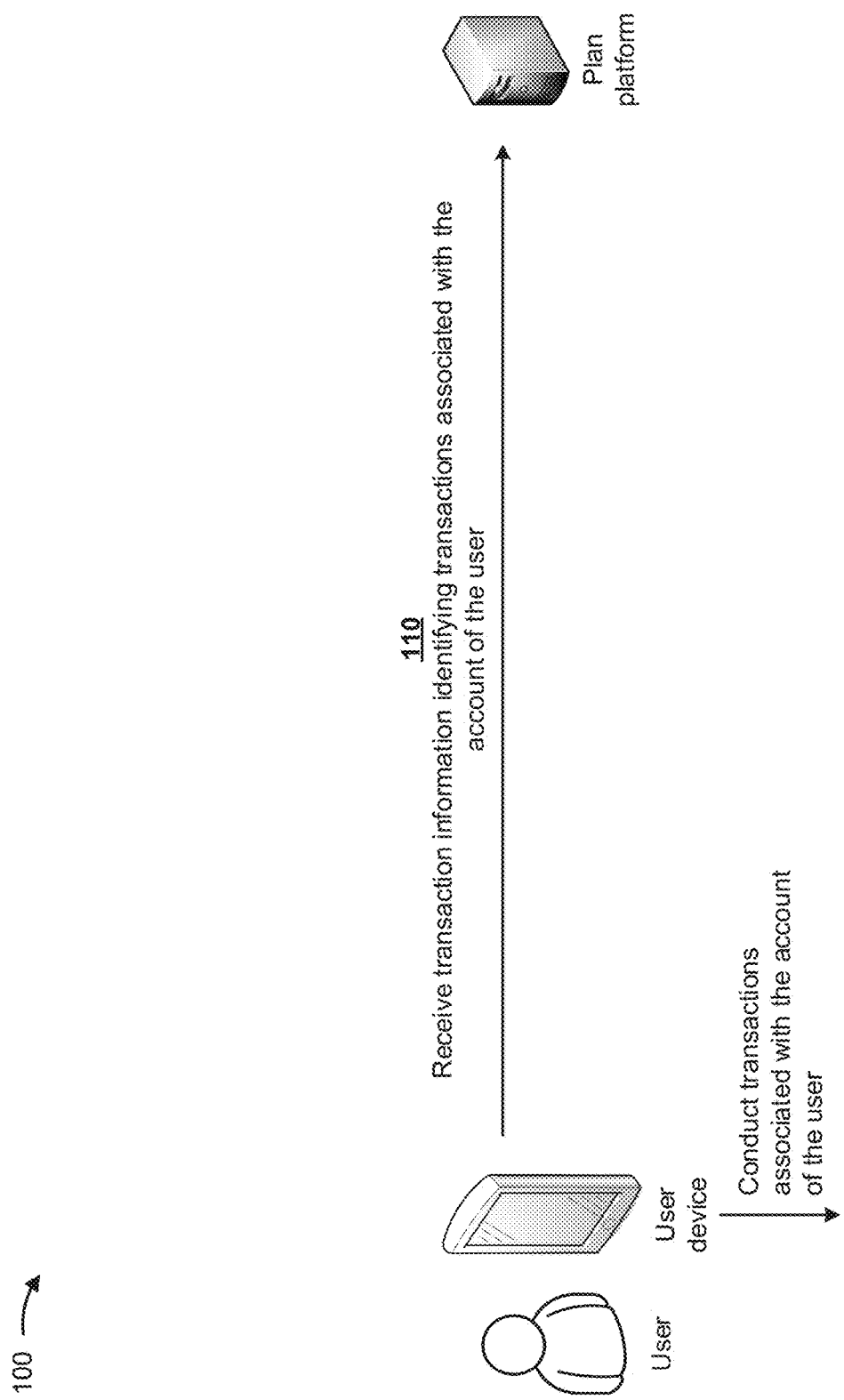

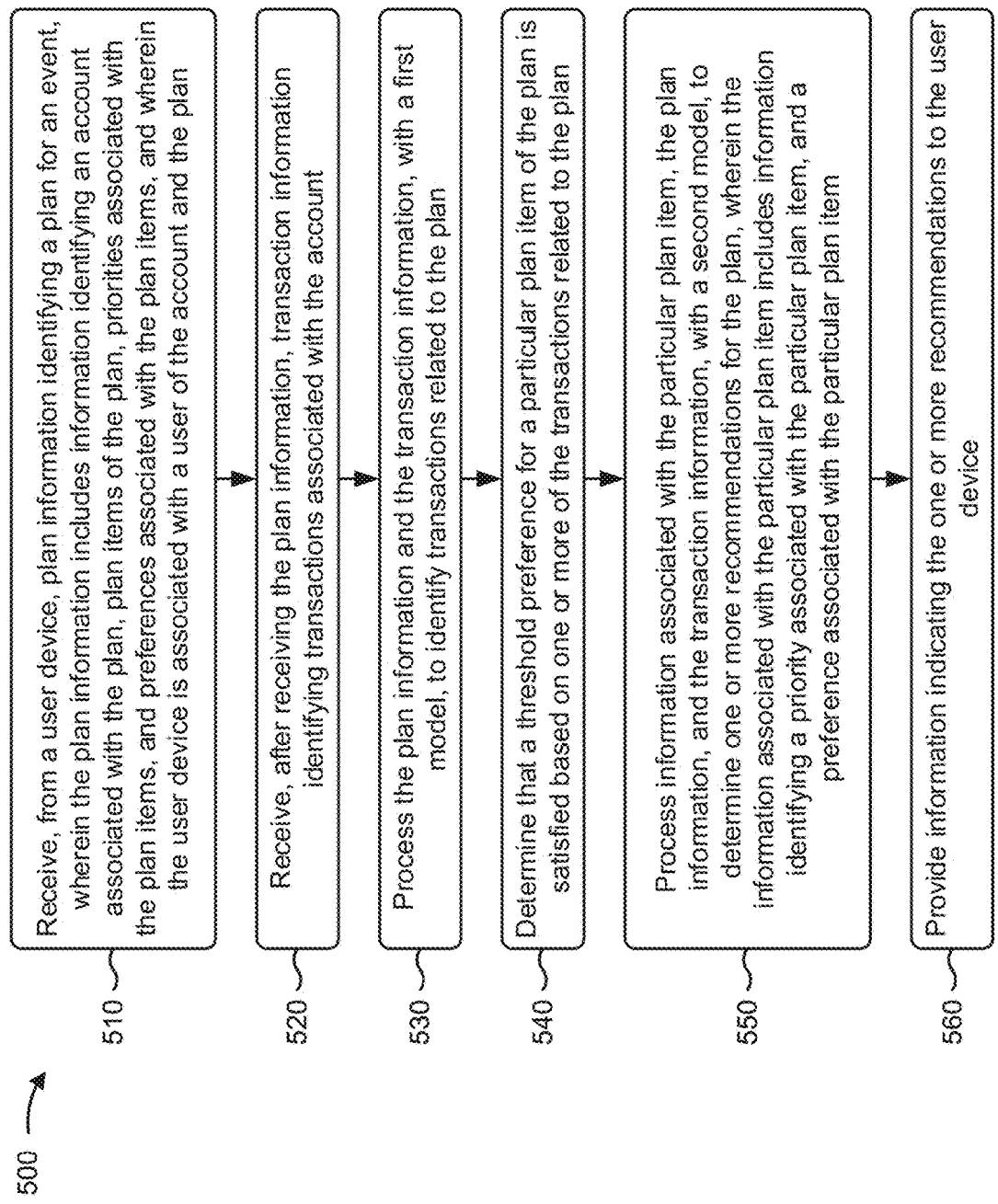

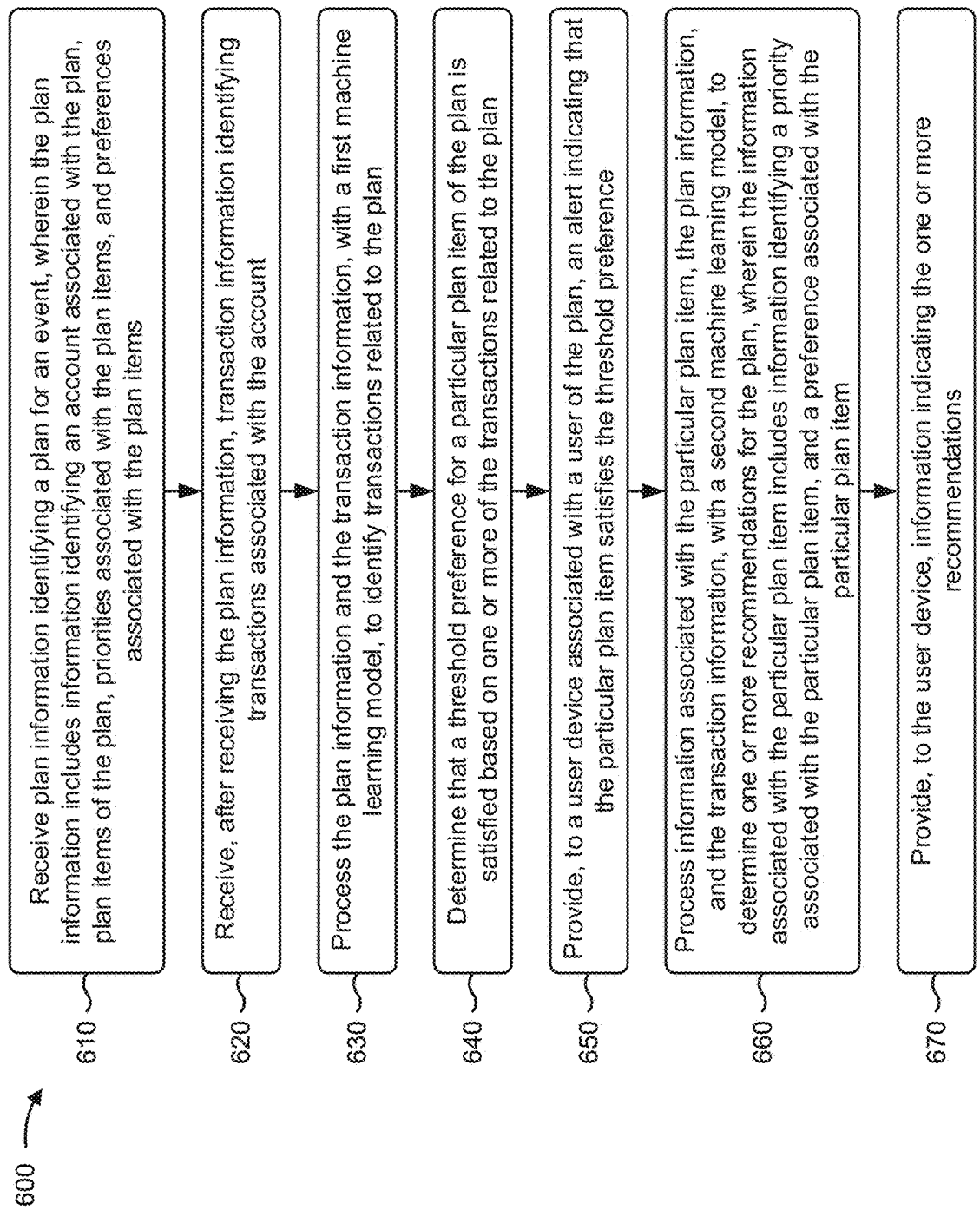

UTILIZING MACHINE LEARNING MODELS TO AUTOMATICALLY PERFORM ACTIONS THAT MAINTAIN A PLAN FOR AN EVENT

RELATED APPLICATION

This application is a continuation of U.S. patent application Ser. No. 16/280,675, filed Feb. 20, 2019, which is incorporated herein by reference.

BACKGROUND

A personal plan or a home plan is a plan that allocates future personal income towards expenses, savings, debt repayment, and/or the like. Past spending and personal debt may be considered when creating a personal plan. A person may create a personal plan for one or more events. For example, a person may create a monthly plan (e.g., where a month is the event) to plan for costs associated with housing, food, transportation, and/or the like. In another example, a person may create a plan for a trip (e.g., a business trip, a vacation, and/or the like) to plan for costs associated with lodging, food, travel, entertainment, and/or the like.

SUMMARY

According to some implementations, a method may include receiving plan information identifying a plan for an event, wherein the plan information includes information identifying an account associated with the plan, plan items of the plan, priorities associated with the plan items, and preferences associated with the plan items. The method may include receiving, after receiving the plan information, transaction information identifying transactions associated with the account, and processing the plan information and the transaction information, with a first machine learning model, to identify transactions related to the plan. The method may include determining that a threshold preference for a particular plan item of the plan is satisfied based on one or more of the transactions related to the plan. The method may include processing information associated with the particular plan item, the plan information, and the transaction information, with a second machine learning model, to determine one or more recommendations for the plan, wherein the information associated with the particular plan item includes information identifying a priority associated with the particular plan item, and a preference associated with the particular plan item. The method may include automatically performing one or more actions based on the one or more recommendations for the plan.

According to some implementations, a device may include one or more memories, and one or more processors, communicatively coupled to the one or more memories, to receive, from a user device, plan information identifying a plan for an event, wherein the plan information includes information identifying an account associated with the plan, plan items of the plan, priorities associated with the plan items, and preferences associated with the plan items, and wherein the user device is associated with a user of the account and the plan. The one or more processors may receive, after receiving the plan information, transaction information identifying transactions associated with the account, and process the plan information and the transaction information, with a first model, to identify transactions related to the plan. The one or more processors may determine that a threshold preference for a particular plan item of the plan is satisfied based on one or more of the transactions related to the plan. The one or more processors may process information associated with the particular plan item, the plan information, and the transaction information, with a second model, to determine one or more recommendations for the plan, wherein the information associated with the particular plan item includes information identifying a priority associated with the particular plan item, and a preference associated with the particular plan item, and provide information indicating the one or more recommendations to the user device.

According to some implementations, a non-transitory computer-readable medium may store instructions that include one or more instructions that, when executed by one or more processors of a device, cause the one or more processors to receive plan information identifying a plan for an event, wherein the plan information includes information identifying an account associated with the plan, plan items of the plan, priorities associated with the plan items, and preferences associated with the plan items. The one or more instructions may cause the one or more processors to receive, after receiving the plan information, transaction information identifying transactions associated with the account, and process the plan information and the transaction information, with a first machine learning model, to identify transactions related to the plan. The one or more instructions may cause the one or more processors to determine that a threshold preference for a particular plan item of the plan is satisfied based on one or more of the transactions related to the plan, and provide, to a user device associated with a user of the plan, an alert indicating that the particular plan item satisfies the threshold preference. The one or more instructions may cause the one or more processors to process information associated with the particular plan item, the plan information, and the transaction information, with a second machine learning model, to determine one or more recommendations for the plan, wherein the information associated with the particular plan item includes information identifying a priority associated with the particular plan item, and a preference associated with the particular plan item. The one or more instructions may cause the one or more processors to provide, to the user device, information indicating the one or more recommendations.

BRIEF DESCRIPTION OF THE DRAWINGS

FIGS. 1A-1G are diagrams of an example implementation described herein.

FIGS. 4-6 are flow charts of example processes for utilizing machine learning models to automatically perform actions that maintain a plan for an event.

DETAILED DESCRIPTION

The following detailed description of example implementations refers to the accompanying drawings. The same reference numbers in different drawings may identify the same or similar elements.

Maintaining a plan is very difficult when the plan includes unrealistic plan thresholds, the plan is not flexible enough to handle changing conditions (e.g., increased prices of products and/or services), emergency expenses occur, and/or the like. Furthermore, accounting for plan expenses during a specific event (e.g., a business trip) can be cumbersome, require saving receipts for all expenditures, require justifying the expenditures, and/or the like.

Some implementations described herein provide a plan platform that utilizes machine learning models to automatically perform actions that maintain a plan for an event. For example, the plan platform may receive plan information identifying a plan for an event, where the plan information includes information identifying an account associated with the plan, plan items of the plan, priorities associated with the plan items, and preferences associated with the plan items. The plan platform may receive, after receiving the plan information, transaction information identifying transactions associated with the account, and may process the plan information and the transaction information, with a first machine learning model, to identify transactions related to the plan. The plan platform may determine that a threshold preference for a particular plan item of the plan is satisfied based on one or more of the transactions related to the plan, and may process information associated with the particular plan item, the plan information, and the transaction information, with a second machine learning model, to determine one or more recommendations for the plan, where the information associated with the particular plan item includes information identifying a priority associated with the particular plan item, and a preference associated with the particular plan item. The plan platform may automatically perform one or more actions based on the one or more recommendations for the plan.

In this way, the plan platform may proactively act when a plan is being violated and may provide one or more recommendations to help stop the plan from being violated. The plan platform may also conserve resources (e.g., processing resources, memory resources, and/or the like) associated with maintaining a plan since the plan platform may simplify maintenance of the plan. Furthermore, the plan platform may simplify the process of accounting for plan expenses during a specific event by automatically tracking transactions (e.g., expenditures), justifying the expenditures, and/or the like.

Figure 1A:
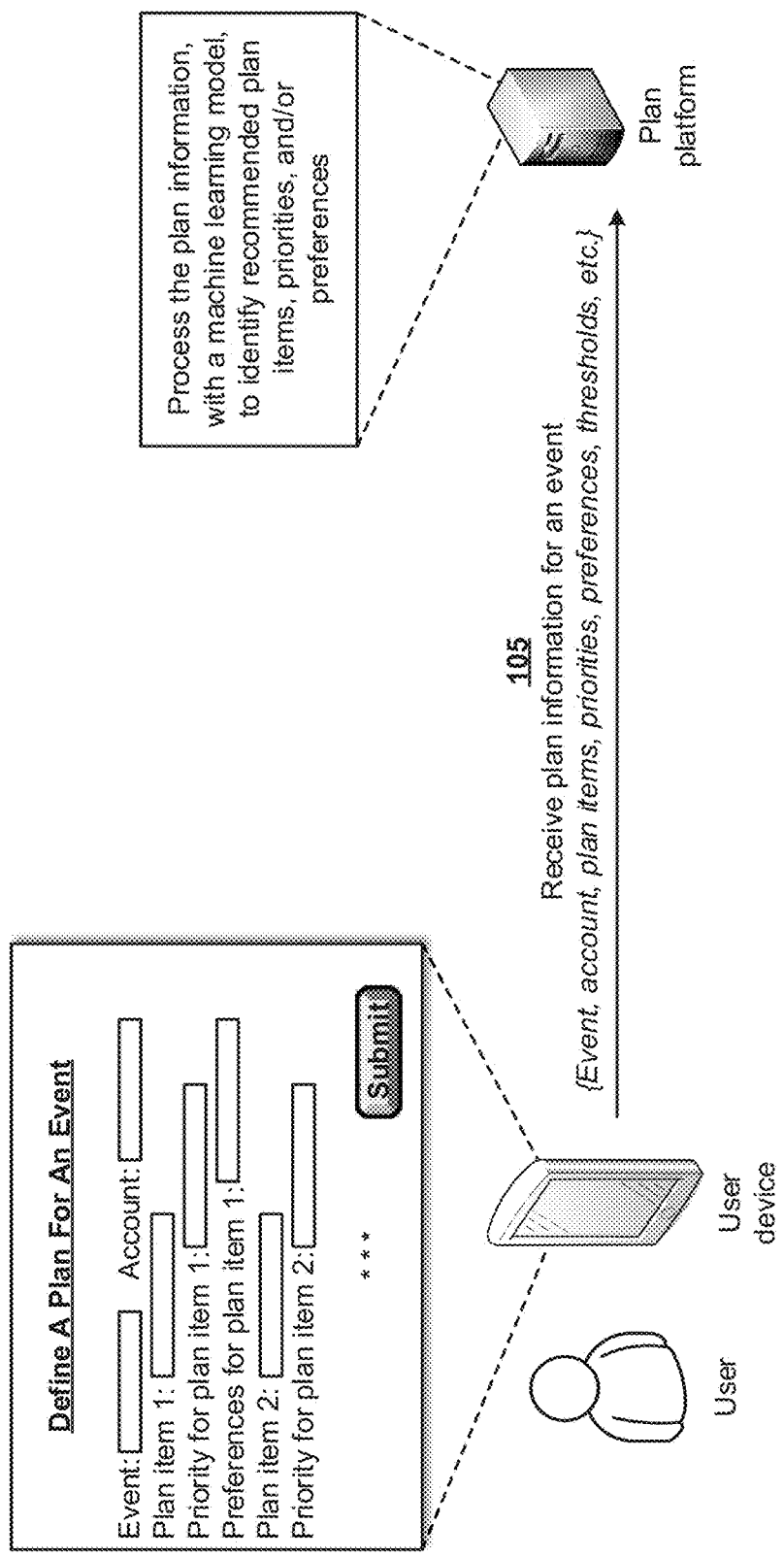

FIGS. 1A-1G are diagrams of an example implementation 100 described herein. As shown in FIGS. 1A-1G, a user device may be associated with a user and a plan platform. As shown in FIG. 1A, the user of the user device may utilize the user device to define a plan for an event. In some implementations, the plan may include a personal budget, a work budget, a financial plan, a retirement plan, a savings plan, a spending plan, and/or the like. In some implementations, the event may include a recurring time period (e.g., daily, weekly, monthly, and/or the like), a vacation, a business trip, a transaction, college, and/or the like.

In some implementations, the user may utilize the user device to receive an application from the plan platform and may install the application on the user device. The application may enable the user to utilize the user device to define the plan for the event, to provide the plan to the plan platform, to make changes to the plan, to receive recommendations (e.g., from the plan platform) with respect to the plan, and/or the like.

As further shown in FIG. 1A, the user device may present, to the user, a user interface that enables the user to define the plan for the event. For example, the user interface may request information identifying the event, an account associated with the user (e.g., from which funds are to be used for the event, an account associated with a transaction card, such as a credit card, a debit card, a gift card, a rewards card, and/or the like), plan items (e.g., plan categories, such as travel, entertainment, lodging, food, and/or the like), priorities for the plan items (e.g., the travel category is more important than the entertainment category and funds may be used from the entertainment category for the travel category), preferences for the plans (e.g., amounts of funds allocated to the plan items, thresholds indicating when funds allocated to the plan items are almost depleted or are depleted, whether to receive alerts associated with the thresholds, and/or the like), and/or the like. In some implementations, threshold preferences for plan items may be time sensitive. For example, if the user is planning for a trip (e.g., with a $250 budget for a five-day trip, or $50 per day of the trip), the user may exceed a daily threshold (e.g., $50 per day) for the trip based on current spending (e.g., the user spends $160 by the third day of the trip). In such an example, the plan platform may recommend that the user adjust an upcoming daily budget in order to satisfy the trip budget (e.g., only spend $25 tomorrow).

As further shown in FIG. 1A, and by reference number 105, the plan platform may receive, from the user device, plan information for the event (e.g., the information defined by the user via the user interface). In some implementations, the plan platform may process the plan information, with a machine learning model, to identify recommended plan items (e.g., if the user is traveling to a third world country, the plan platform may recommend a plan item for medication), recommended priorities for one or more plan items (e.g., if the user is traveling to a costly area, the plan platform may recommend prioritizing lodging and food over other plan items), recommended preferences for one or more plan items (e.g., the plan platform may recommend increasing a threshold for an entertainment category if the user values entertainment), and/or the like. In some implementations, the plan platform may provide information identifying the recommended plan items, priorities, preferences, and/or the like to the user device while the user is defining the plan.

In some implementations, the machine learning model may include a Markov model, a Bayesian model, a Bayesian-Markov decision model, and/or the like that identifies recommended plan items, priorities, preferences, and/or the like. In some implementations, the plan platform may perform a training operation on the machine learning model with historical plan information (e.g., from prior plans of the user, from plans of other similar users, and/or the like).

The plan platform may separate the historical plan information into a training set, a validation set, a test set, and/or the like. In some implementations, the plan platform may train the machine learning model using, for example, an unsupervised training procedure and based on the historical plan information. For example, the plan platform may perform dimensionality reduction to reduce the historical plan information to a minimum feature set, thereby reducing resources (e.g., processing resources, memory resources, and/or the like) to train the machine learning model, and may apply a classification technique, to the minimum feature set.

In some implementations, the plan platform may use a logistic regression classification technique to determine a categorical outcome (e.g., identified plan items, preferences, priorities, and/or the like). Additionally, or alternatively, the plan platform may use a naïve Bayesian classifier technique. In this case, the plan platform may perform binary recursive partitioning to split the historical plan information into partitions and/or branches, and use the partitions and/or branches to perform predictions (e.g., identified plan items, priorities, preferences, and/or the like). Based on using recursive partitioning, the plan platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the plan platform may use a support vector machine (SVM) classifier technique to generate a non-linear boundary between data points in the training set. In this case, the non-linear boundary is used to classify test data into a particular class.

Additionally, or alternatively, the plan platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the plan platform may use one or more other model training techniques, such as a neural network technique, a latent semantic indexing technique, and/or the like. For example, the plan platform may perform an artificial neural network processing technique (e.g., using a two-layer feedforward neural network architecture, a three-layer feedforward neural network architecture, and/or the like) to perform pattern recognition with regard to patterns of the historical plan information. In this case, using the artificial neural network processing technique may improve an accuracy of the trained machine learning model generated by the plan platform by being more robust to noisy, imprecise, or incomplete data, and by enabling the plan platform to detect patterns and/or trends undetectable to human analysts or systems using less complex techniques.

As shown in FIG. 1B, the user may utilize the user device to conduct transactions associated with the account of the user. For example, the user may utilize the user device to conduct transactions that are related to the event (e.g., purchasing food, paying for lodging, and/or the like) and/or may utilize the user device to conduct transactions that are not related to the event (e.g., purchasing a computer, purchasing exercise equipment, and/or the like). As further shown in FIG. 1B, and by reference number 110, the plan platform may receive, from the user device, transaction information identifying the transactions associated with the account of the user. In some implementations, the transaction information may include information indicating a purchased item (e.g., a product, a service, and/or the like), financial information associated with the purchase (e.g., information indicating an amount charged to the user for the item, the account of the user that is charged for the item, an invoice number for the item, a confirmation number for the item, and/or the like), and/or the like.

In some implementations, the user device may include a transaction card (e.g., a credit card, a debit card, a gift card, a rewards card, and/or the like) or the user may utilize a transaction card to conduct transactions associated with the account of the user. In such implementations, the transaction information may be received, by the plan platform, from a device other than the user device, such as from a merchant device associated with a merchant with which the user is conducting a transaction via the transaction card.

In some implementations, the plan platform may perform natural language processing on the transaction information so that the transaction information is in a machine-readable format. For example, the plan platform may perform natural language processing on the transaction information to generate natural language processing results, and may analyze the natural language processing results to identify information included in the transaction information. Natural language processing involves techniques performed (e.g., by a computer system) to analyze, understand, and derive meaning from human language in a useful way. Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

Figure 1C:
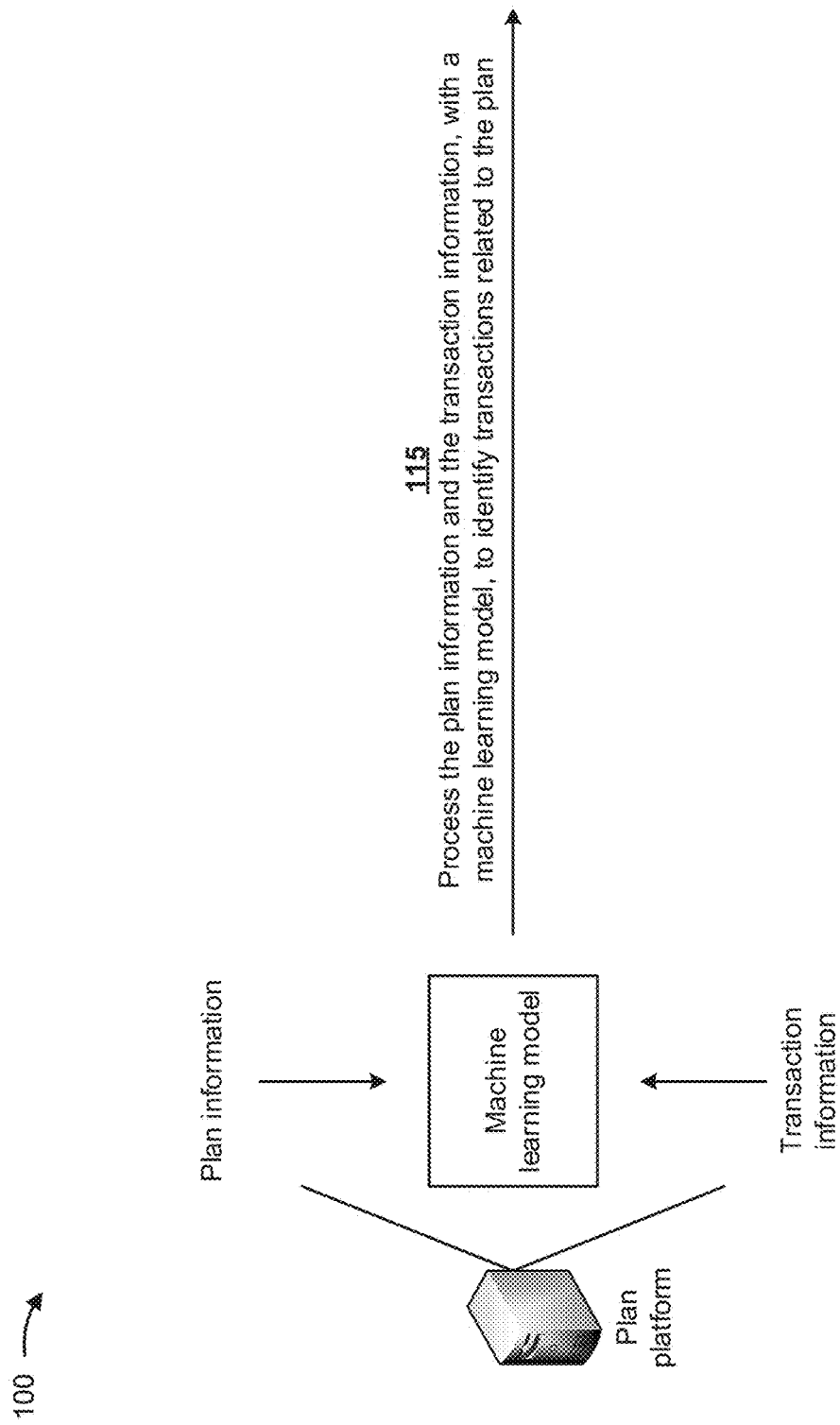

As shown in FIG. 1C, and by reference number 115, the plan platform may process the plan information and the transaction information, with a machine learning model, to identify transactions related to the plan. In some implementations, the machine learning model may identify a transaction related to the plan when the transaction corresponds to one or more of the plan items of the plan. For example, if the transaction relates to buying dinner in a city and at a time associated with the plan, the machine learning model may identify the transaction as being related to a food plan item of the plan. In another example, if the transaction relates to buying lawn fertilizer, the machine learning model may not identify the transaction as being related to a plan item of the plan.

In some implementations, the machine learning model may include a pattern recognition model that identifies transactions related to the plan. In some implementations, the plan platform may perform a training operation on the machine learning model with historical plan information (e.g., from prior plans of the user, from plans of other similar users, and/or the like) and historical transaction information (e.g., from prior transactions of the user, from transactions of other similar users, and/or the like), as described above in connection with FIG. 1A.

Figure 1D:
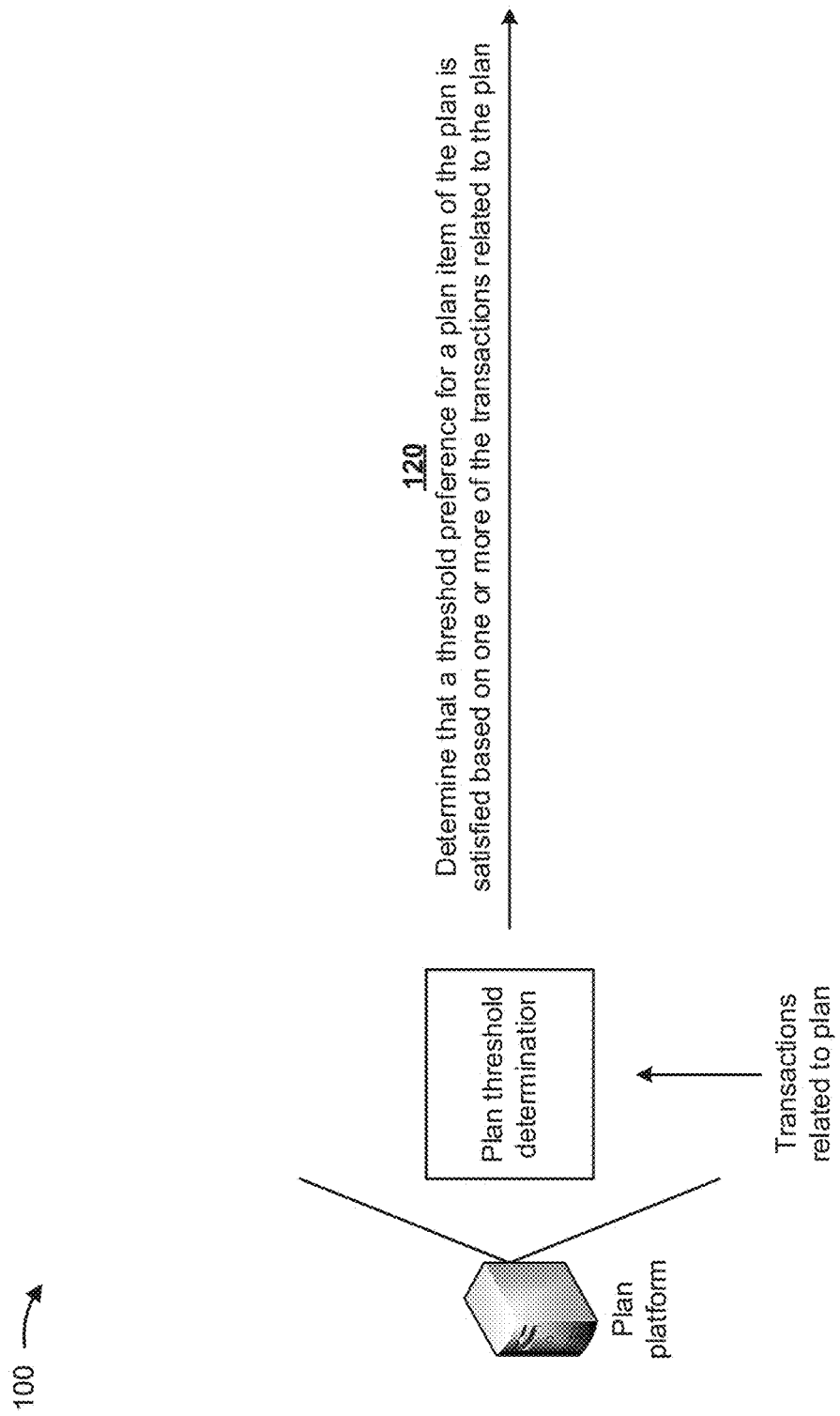

As shown in FIG. 1D, and by reference number 120, the plan platform may determine that a threshold preference for a plan item of the plan is satisfied based on one or more of the transactions related to the plan. For example, if the plan platform identifies three transactions that relate to an entertainment category of the plan (e.g., a movie that costs $50, a show that costs $200, and a sporting event that costs $150), the plan platform may determine that the three transactions satisfy a threshold preference (e.g., a budget of $400 for entertainment) for the entertainment category of the plan. In some implementations, the threshold preference may be set to less than an actual budget for a plan item of the plan (e.g., a threshold preference of $350 for entertainment with a total budget of $400 for entertainment).

In some implementations, the plan platform may determine that two or more threshold preferences for plan items of the plan are satisfied based on one or more of the transactions related to the plan. In some implementations, the plan platform may provide, to the user device, information identifying the plan item of the plan for which the threshold preference is satisfied. For example, the plan platform may provide, to the user device, a notification (e.g., via email, a short message service (SMS) message, a voice call, the application installed on the user device, and/or the like) alerting the user that the threshold preference for the plan item of the plan is satisfied.

Figure 1E:
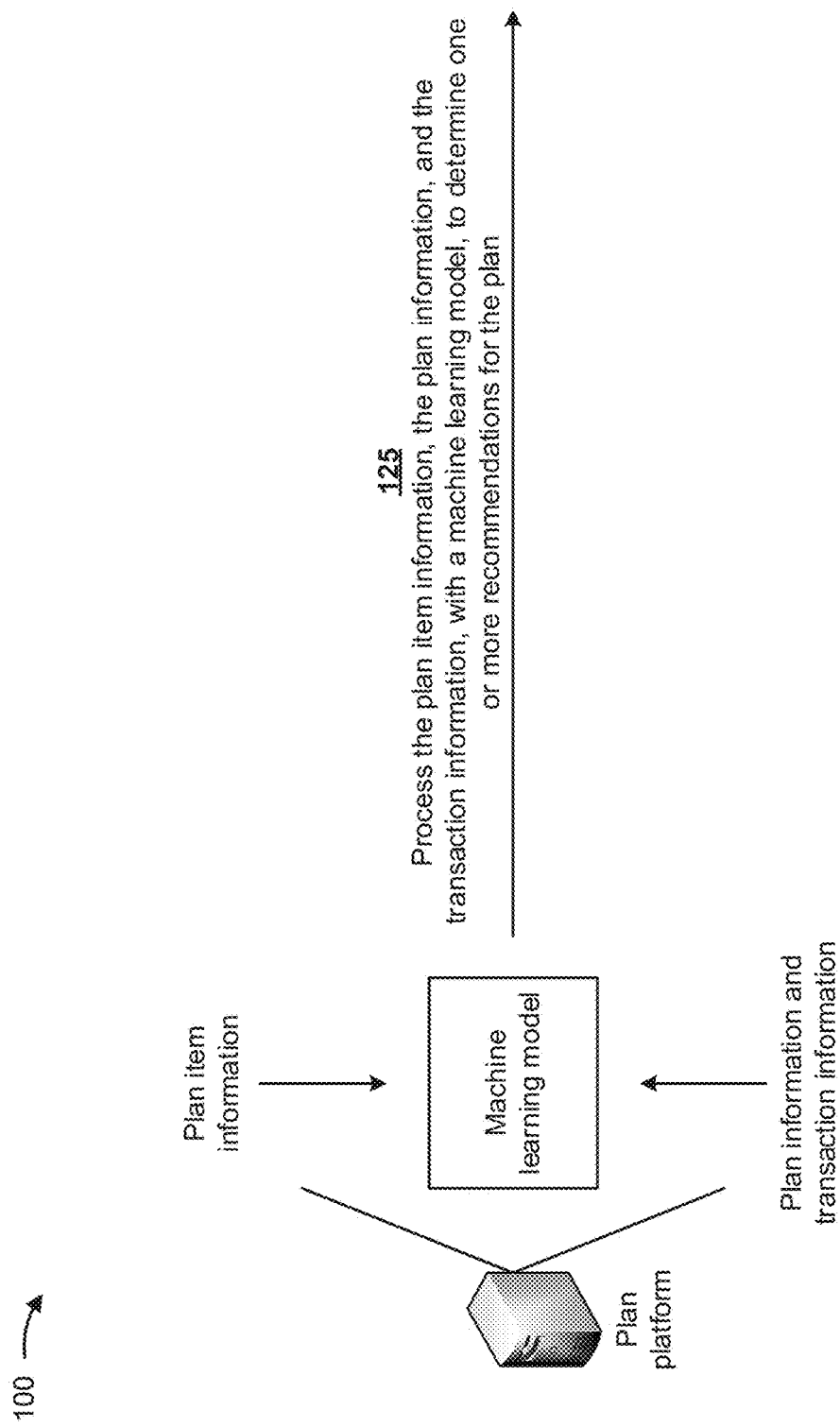

As shown in FIG. 1E, and by reference number 125, the plan platform may process plan item information, the plan information, and the transaction information, with a machine learning model, to determine one or more recommendations for the plan. In some implementations, the plan item information may include information identifying the plan item of the plan for which the threshold preference is satisfied, a priority associated with the identified plan item, a preference associated with the identified plan item, and/or the like. In some implementations, the machine learning model may determine one or more recommendations for the plan based on the plan item satisfying the threshold preference. For example, if the plan item satisfying the threshold relates to a food category of the plan and an entertainment category of the plan has not satisfied a threshold preference, the plan platform may recommend allocating funds from the entertainment category to the food category so that the food category is below the threshold preference.

In some implementations, the machine learning model may include a Markov model, a Bayesian model, a Bayesian-Markov decision model, and/or the like that determines one or more recommendations for the plan based on the plan item information, the plan information, and the transaction information. In some implementations, the plan platform may perform a training operation on the machine learning model with historical plan information (e.g., from prior plans of the user, from plans of other similar users, and/or the like) and historical transaction information (e.g., from prior transactions of the user, from transactions of other similar users, and/or the like), as described above in connection with FIG. 1A.

In some implementations, the plan platform may utilize the machine learning model to compare a priority associated with the plan item that satisfies the threshold preference and priorities associated with other plan items of the plan. The plan platform may determine the one or more recommendations based on comparing the priority associated with the plan item that satisfies the threshold preference and the priorities associated with the other plan items of the plan. For example, if the plan item that satisfies the threshold preference includes a higher priority than two other plan items, the plan platform may recommend allocating funds from the other two plan items so that the plan item is below the threshold preference.

In some implementations, the plan platform may utilize the machine learning model to compare a preference associated with the plan item that satisfies the threshold preference and preferences associated with other plan items of the plan, other accounts of the user, information identifying merchants associated with the other plan items, information identifying products and/or services associated with the other plan items, and/or the like. The plan platform may determine the one or more recommendations based on comparing the preference associated with the plan item that satisfies the threshold preference and the preferences associated with the other plan items of the plan, other accounts of the user, information identifying merchants associated with the other plan items, information identifying products and/or services associated with the other plan items, and/or the like. For example, if the plan item that satisfies the threshold preference is preferred over another plan item (e.g., indicates that the user prefers spending on the plan item more than the other plan item), the plan platform may recommend allocating funds from the other plan item so that the plan item is below the threshold preference, utilizing particular merchants for the other plan items to save money, utilizing other products and/or services for the other plan items to save money, and/or the like.

Figure 1F:
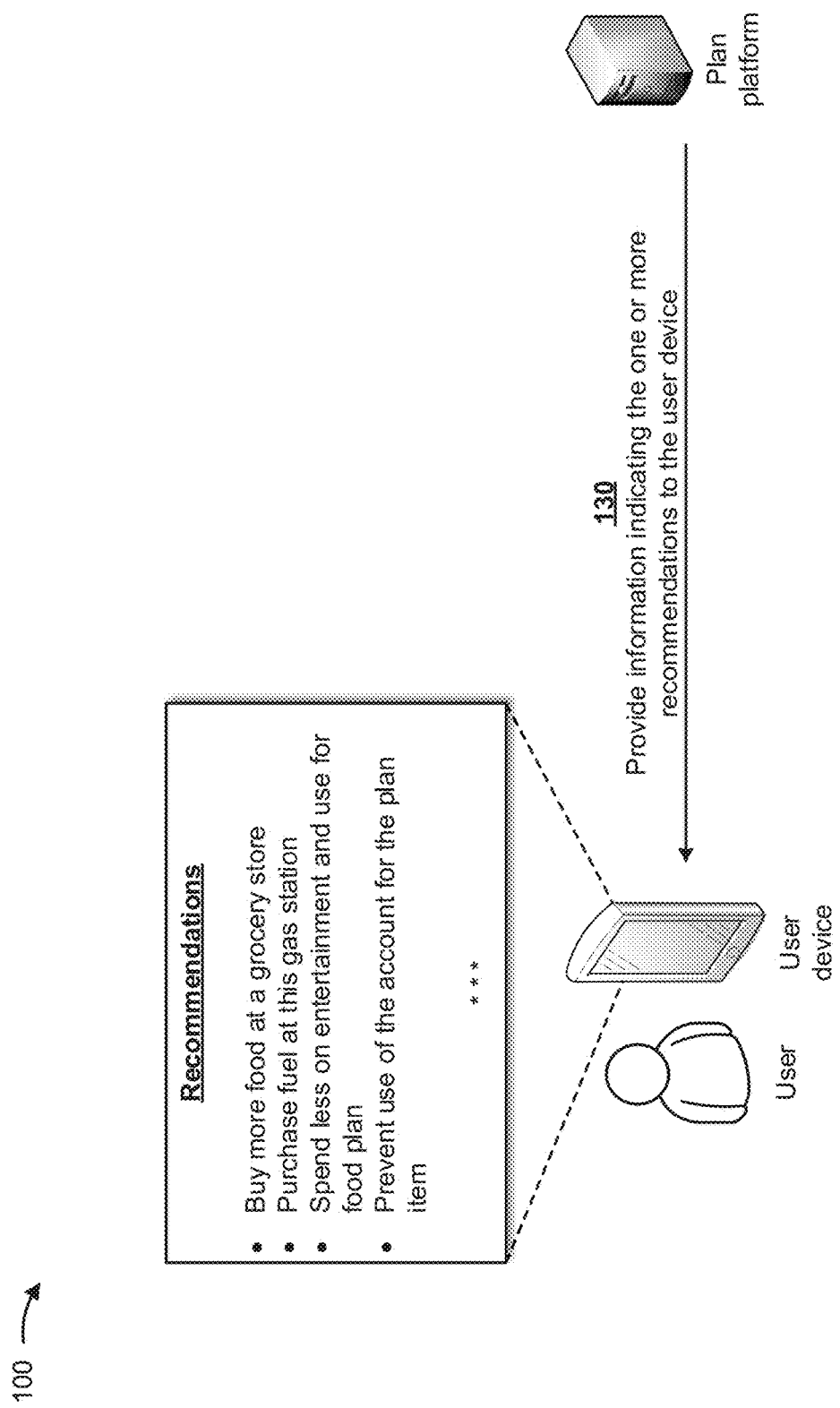

As shown in FIG. 1F, and by reference number 130, the plan platform may provide, to the user device, information indicating the one or more recommendations. In some implementations, the user device may receive the information indicating the one or more recommendations and may present the information to the user via a user interface. For example, the user interface may include information recommending that the user buy food at a grocery store rather than restaurant (e.g., when a food category of the plan satisfies a preference threshold), that the user purchase fuel at a particular gas station (e.g., to save expenses for a transportation category of the plan), that the user spend less on an entertainment category of the plan and use the savings on a food category of the plan, that the user prevent use of the account for a plan item, and/or the like.

Figure 1G:
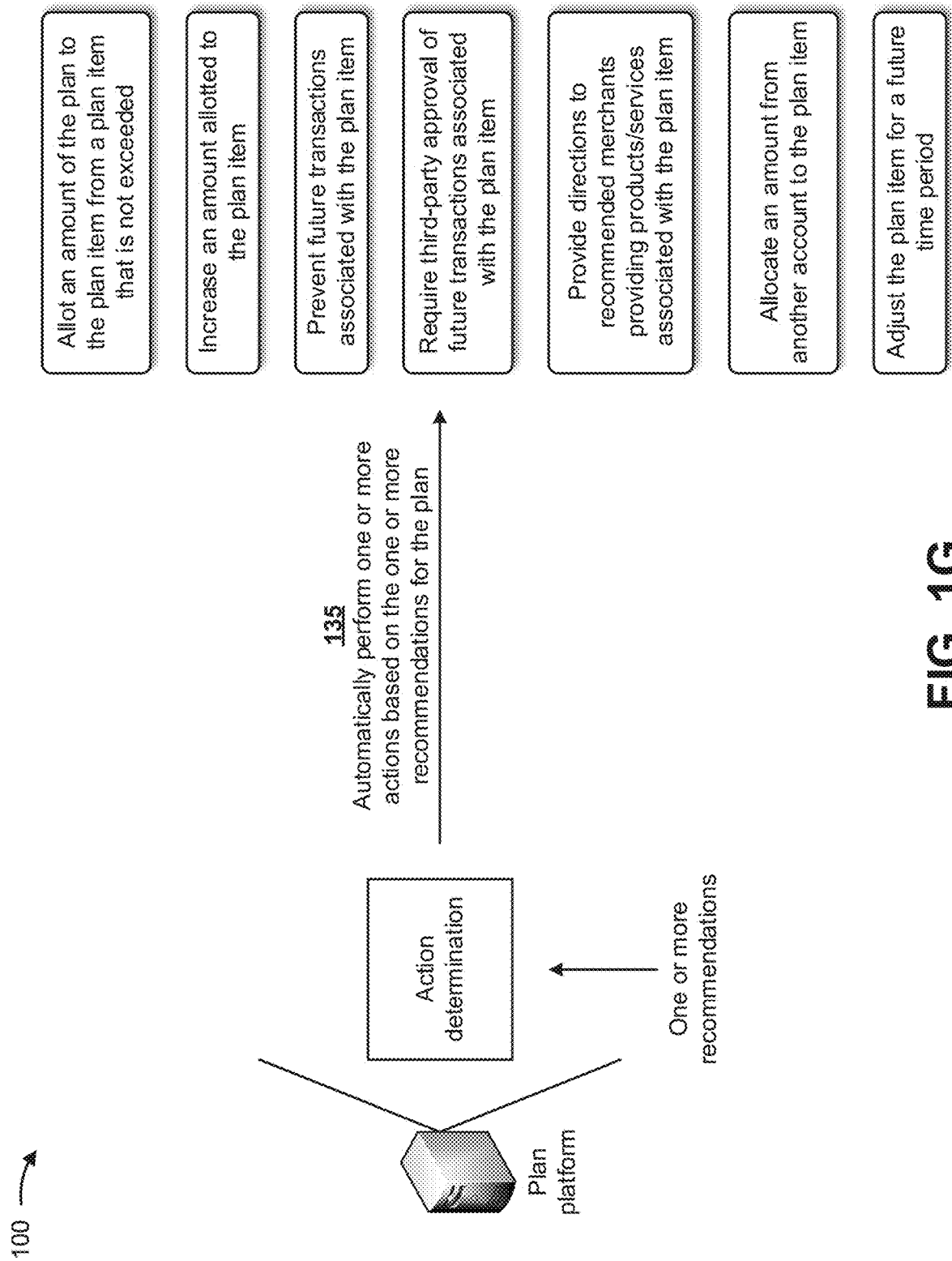

As shown in FIG. 1G, and by reference number 135, the plan platform may automatically perform one or more actions based on the one or more recommendations for the plan. In some implementations, the plan platform may allot an amount of the plan to the plan item that satisfies the threshold preference from a plan item that is not exceeded. In this way, the plan platform may ensure that the plan is maintained and that no threshold preferences are satisfied. In some implementations, the plan platform may increase an amount allotted to the plan item that satisfies the threshold preference. In this way, the plan platform may ensure that the plan item does not exceed the threshold preference.

In some implementations, the plan platform may prevent future transactions associated with the plan item that satisfies the threshold preference. In this way, the plan platform may ensure that the plan item does not exceed the threshold preference and that the plan is maintained. In some implementations, the plan platform may require third-party approval of future transactions associated with the plan item that satisfies the threshold preference. In this way, the plan platform may ensure that the user does not perform any more transactions that causes the plan item to exceed the threshold preference.

In some implementations, the plan platform may provide directions to merchants providing products and/or services associated with the plan item that satisfies the threshold preference. For example, the plan platform may recommend cheaper restaurants to the user and provide directions to the cheaper restaurants. In this way, the plan platform may encourage the user to make wiser decisions with regard to the plan item.

In some implementations, the plan platform may provide the directions to the merchants to an autonomous vehicle that may drive to the merchants for the user. For example, the autonomous vehicle may drive to a grocery to pick up food in order to prevent the user from spending money on a restaurant.

In some implementations, with permission from a third-party, the plan platform may allocate an amount from another account to the plan item that satisfies the threshold preference. In this way, the plan platform may ensure that the plan item is being drawn from another account other than the account associated with the plan. In some implementations, the plan platform may adjust the plan item that satisfies the threshold preference for a future time period. For example, if the plan item is a monthly food plan item, the plan platform may recommend increasing an amount allocated to the monthly food plan item. In this way, the plan platform may ensure that the plan item does not exceed the threshold preference in the future.

In some implementations, the plan platform may research and identify a new account to hold cash reserves (e.g., identify an account that gets the most interest) so that the user may earn interest on the cash reserves and use toward the plan. In some implementations, the plan platform may automatic fill out an application to open this new account. In some implementations, the plan platform may automatically move cash reserves among the user's existing accounts (e.g., move from an account with less interest to an account with more interest) so that user may earn more interest on the cash reserves.

In some implementations, the plan platform may enable the user to identify facts and assumptions (e.g., create scenarios) for the plan and allow the user to adjust the facts and assumptions to determine how the adjustments affect the plan. In some implementations, the plan platform may forecast the plan out in the future for the facts and assumptions. For example, the plan platform may identify expenditures in a month, a year, five years, and/or the like for the plan if the facts and assumptions are maintained, may recommend adjustments to the facts and assumptions and may identify savings in a month, a year, five years, and/or the like based on the adjustments, and/or the like.

In some implementations, the plan platform may automatically populate accounting software with the transaction information and/or the plan information so that use may utilize the accounting software to track the plan and transactions.

In some implementations, the plan platform may automatically generate periodic reports for the plan, such as reports identifying past plans, future projections for the plan, alternative plans to replace the plan, and/or the like.

In some implementations, based on analyzing information associated with other users with of similar plans, the plan platform may generate recommendations to prevent issues with the plan before the issues arise. For example, the plan platform may provide recommendations to avoid issues that arose in the other users' plans.

In this way, several different stages of the process for utilizing machine learning models to automatically perform actions that maintain a plan for an event are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning models to automatically perform actions that maintain a plan for an event. Finally, automating the process for utilizing machine learning models to automatically perform actions that maintain a plan for an event conserves computing resources (e.g., processing resources, memory resources, and/or the like) that would otherwise be wasted in attempting to perform actions that maintain a plan for an event.

As indicated above, FIGS. 1A-1G are provided merely as examples. Other examples are possible and may differ from what was described with regard to FIGS. 1A-1G.

Figure 2:
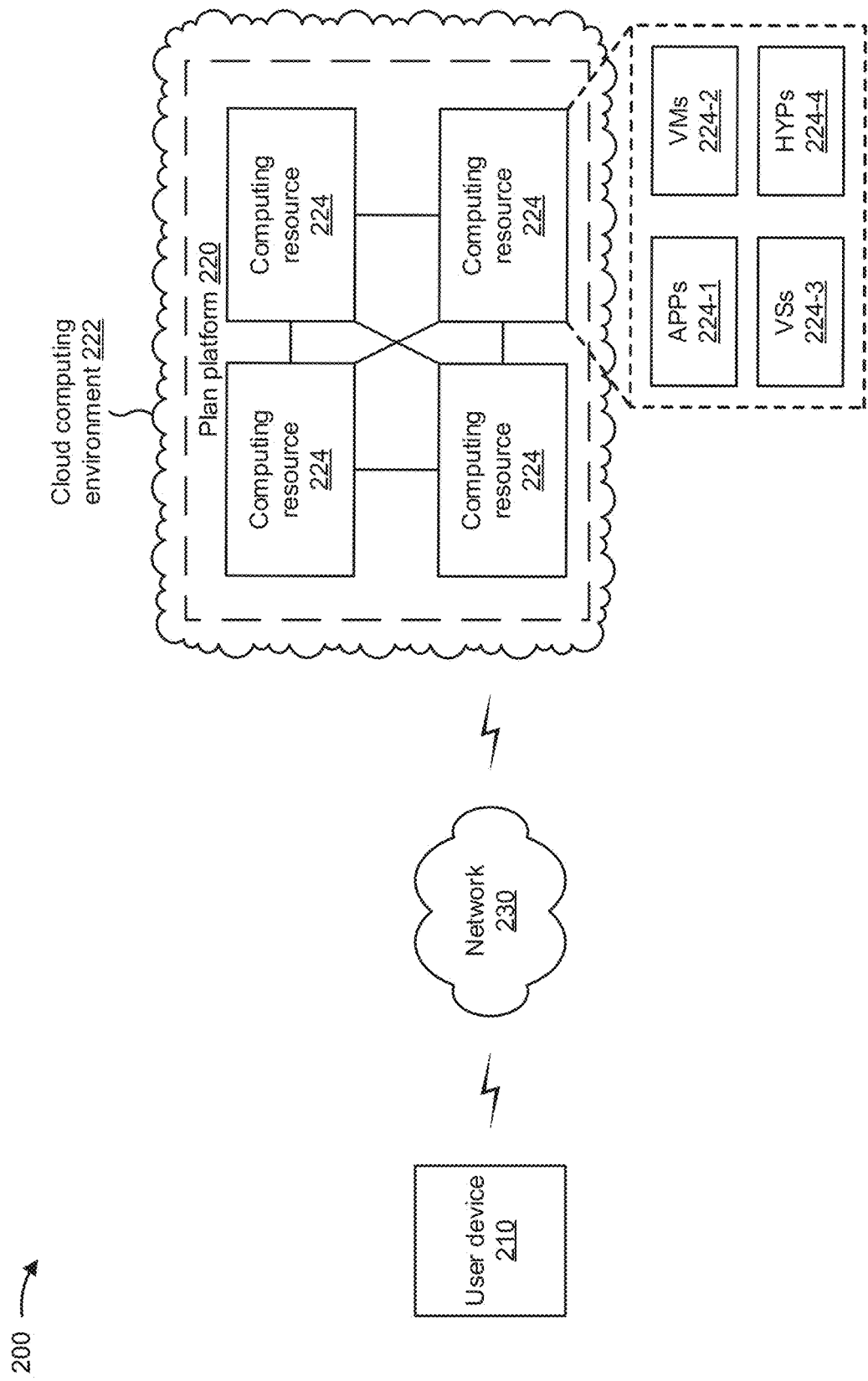
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a plan platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to plan platform 220.

Plan platform 220 includes one or more devices that utilize machine learning models to automatically perform actions that maintain a plan for an event. In some implementations, plan platform 220 may be designed to be modular such that certain software components may be swapped in or out depending on a particular need. As such, plan platform 220 may be easily and/or quickly reconfigured for different uses. In some implementations, plan platform 220 may receive information from and/or transmit information to one or more user devices 210.

In some implementations, as shown, plan platform 220 may be hosted in a cloud computing environment 222. Notably, while implementations described herein describe plan platform 220 as being hosted in cloud computing environment 222, in some implementations, plan platform 220 may not be cloud-based (i.e., may be implemented outside of a cloud computing environment) or may be partially cloud-based.

Cloud computing environment 222 includes an environment that hosts plan platform 220. Cloud computing environment 222 may provide computation, software, data access, storage, etc. services that do not require end-user knowledge of a physical location and configuration of system(s) and/or device(s) that host plan platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host plan platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with plan platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of plan platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
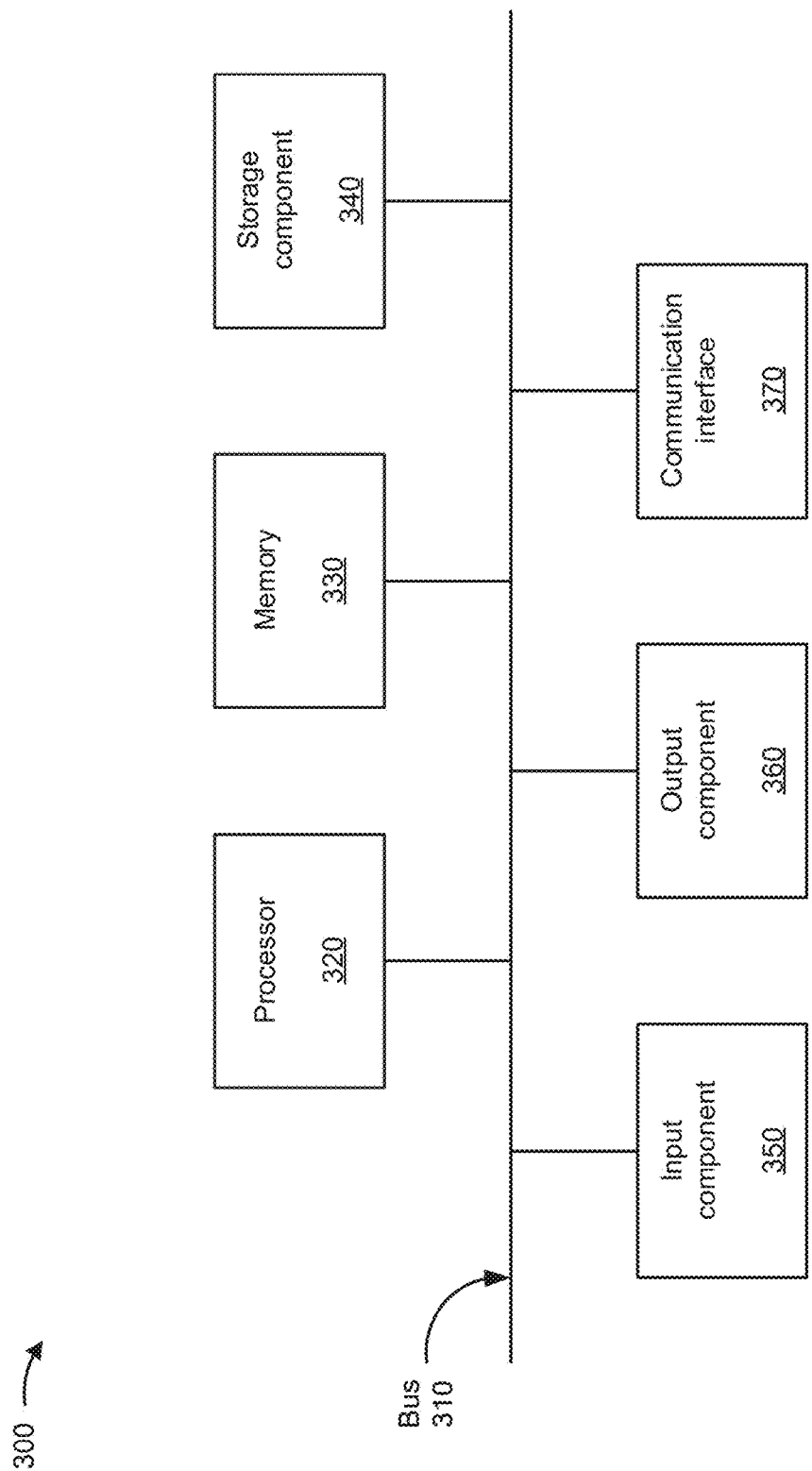
FIG. 3 is a diagram of example components of one or more devices of FIG. 2.

FIG. 3 is a diagram of example components of a device 300. Device 300 may correspond to user device 210, plan platform 220, and/or computing resource 224. In some implementations, user device 210, plan platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
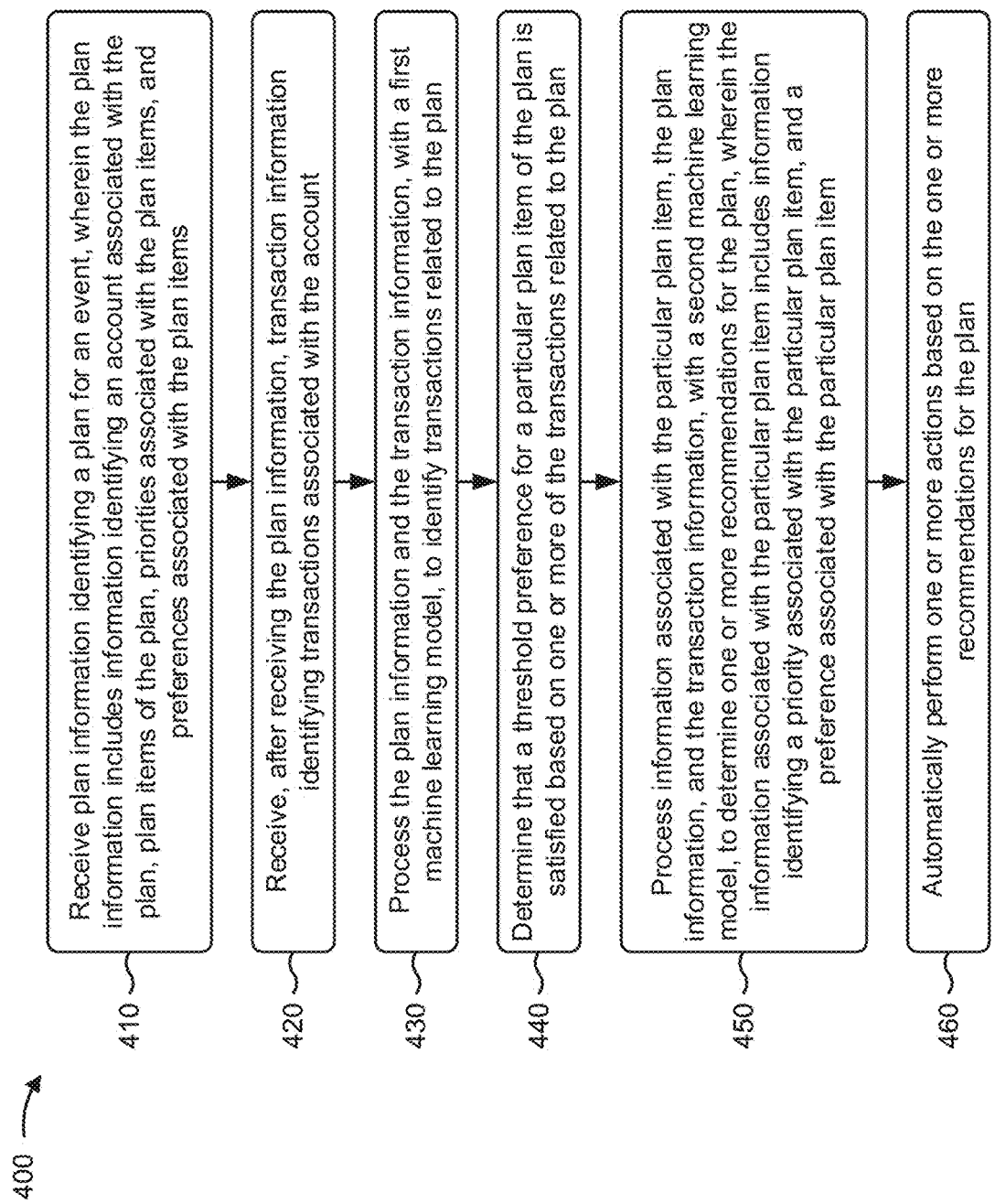

FIG. 4 is a flow chart of an example process 400 for utilizing machine learning models to automatically perform actions that maintain a plan for an event. In some implementations, one or more process blocks of FIG. 4 may be performed by a plan platform (e.g., plan platform 220). In some implementations, one or more process blocks of FIG. 4 may be performed by another device or a group of devices separate from or including the plan platform, such as a user device (e.g., user device 210).

As shown in FIG. 4, process 400 may include receiving plan information identifying a plan for an event, wherein the plan information includes information identifying an account associated with the plan, plan items of the plan, priorities associated with the plan items, and preferences associated with the plan items (block 410). For example, the plan platform (e.g., using computing resource 224, processor 320, communication interface 370, and/or the like) may receive plan information identifying a plan for an event, as described above in connection with FIGS. 1A-2. In some implementations, the plan information may include information identifying an account associated with the plan, plan items of the plan, priorities associated with the plan items, and preferences associated with the plan items.

As further shown in FIG. 4, process 400 may include receiving, after receiving the plan information, transaction information identifying transactions associated with the account (block 420). For example, the plan platform (e.g., using computing resource 224, processor 320, memory 330, communication interface 370, and/or the like) may receive, after receiving the plan information, transaction information identifying transactions associated with the account, as described above in connection with FIGS. 1A-2.

As further shown in FIG. 4, process 400 may include processing the plan information and the transaction information, with a first machine learning model, to identify transactions related to the plan (block 430). For example, the plan platform (e.g., using computing resource 224, processor 320, storage component 340, and/or the like) may process the plan information and the transaction information, with a first machine learning model, to identify transactions related to the plan, as described above in connection with FIGS. 1A-2.

As further shown in FIG. 4, process 400 may include determining that a threshold preference for a particular plan item of the plan is satisfied based on one or more of the transactions related to the plan (block 440). For example, the plan platform (e.g., using computing resource 224, processor 320, memory 330, communication interface 370, and/or the like) may determine that a threshold preference for a particular plan item of the plan is satisfied based on one or more of the transactions related to the plan, as described above in connection with FIGS. 1A-2.

As further shown in FIG. 4, process 400 may include processing information associated with the particular plan item, the plan information, and the transaction information, with a second machine learning model, to determine one or more recommendations for the plan, wherein the information associated with the particular plan item includes information identifying a priority associated with the particular plan item, and a preference associated with the particular plan item (block 450). For example, the plan platform (e.g., using computing resource 224, processor 320, storage component 340, and/or the like) may process information associated with the particular plan item, the plan information, and the transaction information, with a second machine learning model, to determine one or more recommendations for the plan, as described above in connection with FIGS. 1A-2. In some implementations, the information associated with the particular plan item may include information identifying a priority associated with the particular plan item, and a preference associated with the particular plan item.

As further shown in FIG. 4, process 400 may include automatically performing one or more actions based on the one or more recommendations for the plan (block 460). For example, the plan platform (e.g., using computing resource 224, processor 320, memory 330, communication interface 370, and/or the like) may automatically perform one or more actions based on the one or more recommendations for the plan, as described above in connection with FIGS. 1A-2.

Process 400 may include additional implementations, such as any single implementation or any combination of implementations described below and/or described with regard to any other process described herein.

In some implementations, when automatically performing the one or more actions, the plan platform may allot an amount of the plan to the particular plan item from another plan item of the plan, may increase an amount allotted to the particular plan item, may prevent future transactions associated with the particular plan item, may require third-party approval of the future transactions associated with the particular plan item, may provide directions to recommended merchants providing products and/or services associated with the particular plan item, may allocate an amount from another account to the particular plan item, and/or may adjust the particular plan item for a future time period.

In some implementations, the plan platform may provide information indicating the one or more recommendations to a user device associated with a user of the plan. In some implementations, the first machine learning model may include a pattern recognition model, and the second machine learning model may include one or more of a Markov model, a Bayesian model, or a Bayesian-Markov decision model.

In some implementations, when processing the information associated with the particular plan item, the plan information, and the transaction information, with the second machine learning model, to determine the one or more recommendations for the plan, the plan platform may utilize the second machine learning model to compare the priority associated with the particular plan item and the priorities associated with the plan items other than the particular plan item, and may determine the one or more recommendations based on comparing the priority associated with the particular plan item and the priorities associated with the plan items other than the particular plan item.

In some implementations, when processing the information associated with the particular plan item, the plan information, and the transaction information, with the second machine learning model, to determine the one or more recommendations for the plan, the plan platform may utilize the second machine learning model to compare the preference associated with the particular plan item and the preferences associated with the plan items other than the particular plan item, and determine the one or more recommendations based on comparing the preference associated with the particular plan item and the preferences associated with the plan items other than the particular plan item.

In some implementations, the plan platform may process the plan information, with a third machine learning model, to identify recommended plan items, recommended priorities for the recommended plan items, and recommended preferences for the recommended plan items, and may provide the recommended plan items, the recommended priorities, and the recommended preferences to the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning models to automatically perform actions that maintain a plan for an event. In some implementations, one or more process blocks of FIG. 5 may be performed by a plan platform (e.g., plan platform 220). In some implementations, one or more process blocks of FIG. 5 may be performed by another device or a group of devices separate from or including the plan platform, such as a user device (e.g., user device 210).

As shown in FIG. 5, process 500 may include receiving, from a user device, plan information identifying a plan for an event, wherein the plan information includes information identifying an account associated with the plan, plan items of the plan, priorities associated with the plan items, and preferences associated with the plan items, and wherein the user device is associated with a user of the account and the plan (block 510). For example, the plan platform (e.g., using computing resource 224, processor 320, communication interface 370, and/or the like) may receive, from a user device, plan information identifying a plan for an event, as described above in connection with FIGS. 1A-2. In some implementations, the plan information may include information identifying an account associated with the plan, plan items of the plan, priorities associated with the plan items, and preferences associated with the plan items. In some implementations, the user device may be associated with a user of the account and the plan.

As further shown in FIG. 5, process 500 may include receiving, after receiving the plan information, transaction information identifying transactions associated with the account (block 520). For example, the plan platform (e.g., using computing resource 224, processor 320, storage component 340, and/or the like) may receive, after receiving the plan information, transaction information identifying transactions associated with the account, as described above in connection with FIGS. 1A-2.

As further shown in FIG. 5, process 500 may include processing the plan information and the transaction information, with a first model, to identify transactions related to the plan (block 530). For example, the plan platform (e.g., using computing resource 224, processor 320, memory 330, and/or the like) may process the plan information and the transaction information, with a first model, to identify transactions related to the plan, as described above in connection with FIGS. 1A-2.

As further shown in FIG. 5, process 500 may include determining that a threshold preference for a particular plan item of the plan is satisfied based on one or more of the transactions related to the plan (block 540). For example, the plan platform (e.g., using computing resource 224, processor 320, storage component 340, and/or the like) may determine that a threshold preference for a particular plan item of the plan is satisfied based on one or more of the transactions related to the plan, as described above in connection with FIGS. 1A-2.

As further shown in FIG. 5, process 500 may include processing information associated with the particular plan item, the plan information, and the transaction information, with a second model, to determine one or more recommendations for the plan, wherein the information associated with the particular plan item includes information identifying a priority associated with the particular plan item, and a preference associated with the particular plan item (block 550). For example, the plan platform (e.g., using computing resource 224, processor 320, memory 330, and/or the like) may process information associated with the particular plan item, the plan information, and the transaction information, with a second model, to determine one or more recommendations for the plan, as described above in connection with FIGS. 1A-2. In some implementations, the information associated with the particular plan item may include information identifying a priority associated with the particular plan item, and a preference associated with the particular plan item.

As further shown in FIG. 5, process 500 may include providing information indicating the one or more recommendations to the user device (block 560). For example, the plan platform (e.g., using computing resource 224, processor 320, memory 330, communication interface 370, and/or the like) may provide information indicating the one or more recommendations to the user device, as described above in connection with FIGS. 1A-2.

Process 500 may include additional implementations, such as any single implementation or any combination of implementations described below and/or described with regard to any other process described herein.

In some implementations, the plan platform may automatically perform one or more actions based on the one or more recommendations for the plan. In some implementations, when automatically performing the one or more actions, the plan platform may allot an amount of the plan to the particular plan item from another plan item of the plan, may increase an amount allotted to the particular plan item, may prevent future transactions associated with the particular plan item, may require third-party approval of the future transactions associated with the particular plan item, may provide directions to recommended merchants providing products and/or services associated with the particular plan item, may allocate an amount from another account to the particular plan item, and/or may adjust the particular plan item for a future time period.

In some implementations, the plan platform may provide, to the user device, information indicating that the particular plan item satisfies the threshold preference. In some implementations, when processing the information associated with the particular plan item, the plan information, and the transaction information, with the second model, to determine the one or more recommendations for the plan, the plan platform may utilize the second model to compare the priority associated with the particular plan item and the priorities associated with the plan items other than the particular plan item, and may determine the one or more recommendations based on comparing the priority associated with the particular plan item and the priorities associated with the plan items other than the particular plan item.

In some implementations, when processing the information associated with the particular plan item, the plan information, and the transaction information, with the second model, to determine the one or more recommendations for the plan, the plan platform may utilize the second model to compare the preference associated with the particular plan item and the preferences associated with the plan items other than the particular plan item, and may determine the one or more recommendations based on comparing the preference associated with the particular plan item and the preferences associated with the plan items other than the particular plan item.

In some implementations, the plan may be associated with a recurring time period and the plan platform may disregard, after expiration of the recurring time period, the transactions related to the plan, may receive, after expiration of the recurring time period, new transaction information identifying new transactions associated with the account, and may process the plan information and the new transaction information, with the first model, to identify new transactions related to the plan Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning models to automatically perform actions that maintain a plan for an event. In some implementations, one or more process blocks of FIG. 6 may be performed by a plan platform (e.g., plan platform 220). In some implementations, one or more process blocks of FIG. 6 may be performed by another device or a group of devices separate from or including the plan platform, such as a user device (e.g., user device 210).

As shown in FIG. 6, process 600 may include receiving plan information identifying a plan for an event, wherein the plan information includes information identifying an account associated with the plan, plan items of the plan, priorities associated with the plan items, and preferences associated with the plan items (block 610). For example, the plan platform (e.g., using computing resource 224, processor 320, communication interface 370, and/or the like) may receive plan information identifying a plan for an event, as described above in connection with FIGS. 1A-2. In some implementations, the plan information may include information identifying an account associated with the plan, plan items of the plan, priorities associated with the plan items, and preferences associated with the plan items.

As further shown in FIG. 6, process 600 may include receiving, after receiving the plan information, transaction information identifying transactions associated with the account (block 620). For example, the plan platform (e.g., using computing resource 224, processor 320, storage component 340, communication interface 370, and/or the like) may receive, after receiving the plan information, transaction information identifying transactions associated with the account, as described above in connection with FIGS. 1A-2.

As further shown in FIG. 6, process 600 may include processing the plan information and the transaction information, with a first machine learning model, to identify transactions related to the plan (block 630). For example, the plan platform (e.g., using computing resource 224, processor 320, memory 330, and/or the like) may process the plan information and the transaction information, with a first machine learning model, to identify transactions related to the plan, as described above in connection with FIGS. 1A-2.

As further shown in FIG. 6, process 600 may include determining that a threshold preference for a particular plan item of the plan is satisfied based on one or more of the transactions related to the plan (block 640). For example, the plan platform (e.g., using computing resource 224, processor 320, storage component 340, and/or the like) may determine that a threshold preference for a particular plan item of the plan is satisfied based on one or more of the transactions related to the plan, as described above in connection with FIGS. 1A-2.

As further shown in FIG. 6, process 600 may include providing, to a user device associated with a user of the plan, an alert indicating that the particular plan item satisfies the threshold preference (block 650). For example, the plan platform (e.g., using computing resource 224, processor 320, memory 330, communication interface 370, and/or the like) may provide, to a user device associated with a user of the plan, an alert indicating that the particular plan item satisfies the threshold preference, as described above in connection with FIGS. 1A-2.

As further shown in FIG. 6, process 600 may include processing information associated with the particular plan item, the plan information, and the transaction information, with a second machine learning model, to determine one or more recommendations for the plan, wherein the information associated with the particular plan item includes information identifying a priority associated with the particular plan item, and a preference associated with the particular plan item (block 660). For example, the plan platform (e.g., using computing resource 224, processor 320, memory 330, and/or the like) may process information associated with the particular plan item, the plan information, and the transaction information, with a second machine learning model, to determine one or more recommendations for the plan, as described above in connection with FIGS. 1A-2. In some implementations, the information associated with the particular plan item may include information identifying a priority associated with the particular plan item, and a preference associated with the particular plan item.

As further shown in FIG. 6, process 600 may include providing, to the user device, information indicating the one or more recommendations (block 670). For example, the plan platform (e.g., using computing resource 224, processor 320, communication interface 370, and/or the like) may provide, to the user device, information indicating the one or more recommendations, as described above in connection with FIGS. 1A-2.

Process 600 may include additional implementations, such as any single implementation or any combination of implementations described below and/or described with regard to any other process described herein.

In some implementations, the plan platform may automatically perform one or more actions based on the one or more recommendations for the plan. In some implementations, when automatically performing the one or more actions, the plan platform may allot an amount of the plan to the particular plan item from another plan item of the plan, may increase an amount allotted to the particular plan item, may prevent future transactions associated with the particular plan item, may require third-party approval of the future transactions associated with the particular plan item, may provide directions to recommended merchants providing products and/or services associated with the particular plan item, may allocate an amount from another account to the particular plan item, and/or may adjust the particular plan item for a future time period.

In some implementations, when processing the information associated with the particular plan item, the plan information, and the transaction information, with the second machine learning model, to determine the one or more recommendations for the plan, the plan platform may utilize the second machine learning model to compare the priority associated with the particular plan item and the priorities associated with the plan items other than the particular plan item, and may determine the one or more recommendations based on comparing the priority associated with the particular plan item and the priorities associated with the plan items other than the particular plan item.

In some implementations, when processing the information associated with the particular plan item, the plan information, and the transaction information, with the second machine learning model, to determine the one or more recommendations for the plan, the plan platform may utilize the second machine learning model to compare the preference associated with the particular plan item and the preferences associated with the plan items other than the particular plan item, and may determine the one or more recommendations based on comparing the preference associated with the particular plan item and the preferences associated with the plan items other than the particular plan item. In some implementations, the account may be associated with one or more of a credit card, a debit card, a gift card, or a rewards card.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, plan information identifying a plan for an event and a plan item of the plan;
   receiving, by the device, transaction information identifying transactions,
      the transactions including an expenditure related to a purchase;
   processing, by the device, the plan information and the transaction information to identify one or more transactions, of the transactions, related to the plan;
   determining, by the device, that a threshold preference for the plan item of the plan is satisfied based on a first transaction of the one or more transactions related to the plan,
      wherein the threshold preference is associated with a budget associated with the plan item;
   processing, by the device and based on determining that the threshold preference is satisfied, information associated with the plan item, the plan information, and the transaction information, with a machine learning model, to determine one or more recommendations for the plan; and
   automatically performing, by the device, one or more actions based on the one or more recommendations for the plan.

2. The method of claim 1, wherein the threshold preference is satisfied when the first transaction exceeds the budget associated with the plan item.

3. The method of claim 1, wherein the threshold preference is set to less than the budget associated with the plan item.

4. The method of claim 1, wherein automatically performing the one or more actions includes one or more of:
   allotting an amount of the plan to the plan item from another plan item of the plan;
   increasing an amount allotted to the plan item;

preventing future transactions associated with the plan item;
requiring third-party approval of the future transactions associated with the plan item;
providing directions to recommended merchants providing products and/or services associated with the plan item;
allocating an amount from another account to the plan item; or
adjusting the plan item for a future time period.

5. The method of claim 1, further comprising:
providing information indicating the one or more recommendations to a user device associated with a user of the plan.

6. The method of claim 1, wherein:
the machine learning model includes one or more of:
a Markov model,
a Bayesian model, or
a Bayesian-Markov decision model.

7. The method of claim 1, wherein the transactions are related to the event, and wherein the transaction information includes information associated with additional transactions not related to the event.

8. The method of claim 1, wherein the information associated with the plan item includes information identifying:
a priority associated with the plan item, and
a preference associated with the plan item.

9. A device, comprising:
a memory; and
one or more processors to:
receive plan information identifying a plan for an event, event and a plan item of the plan,
receive transaction information identifying transactions,
the transactions including an expenditure related to a purchase;
process the plan information and the transaction information to identify one or more transactions, of the transactions, related to the plan;
determine that a threshold preference for the plan item of the plan is satisfied based on a first transaction of the one or more transactions related to the plan;
wherein the threshold preference is associated with a budget associated with the plan item;
process, based on determining that the threshold preference is satisfied, information associated with the plan item, the plan information, and the transaction information, with a machine learning model, to determine one or more recommendations for the plan; and
automatically perform one or more actions based on the one or more recommendations for the plan.

10. The device of claim 9, wherein the threshold preference is satisfied when the first transaction exceeds the budget associated with the plan item.

11. The device of claim 9, wherein the threshold preference is set to less than the budget associated with the plan item.

12. The device of claim 9, wherein the one or more actions include one or more of:
allot an amount of the plan to the plan item from another plan item of the plan;
increase an amount allotted to the plan item;
prevent future transactions associated with the plan item;
require third-party approval of the future transactions associated with the plan item;
provide directions to recommended merchants providing products and/or services associated with the plan item;
allocate an amount from another account to the plan item; or
adjust the plan item for a future time period.

13. The device of claim 9, wherein the one or more processors are further to:
provide information indicating the one or more recommendations to a user device associated with a user of the plan.

14. The device of claim 9, wherein:
the machine learning model includes one or more of:
a Markov model,
a Bayesian model, or
a Bayesian-Markov decision model.

15. The device of claim 9, wherein the transactions are related to the event, and wherein the transaction information includes information associated with additional transactions not related to the event.

16. The device of claim 9, wherein the information associated with the plan item includes information identifying:
a priority associated with the plan item, and
a preference associated with the plan item.

17. A non-transitory computer-readable medium storing instructions, the instructions comprising:
one or more instructions that, when executed by one or more processors, cause the one or more processors to:
receive plan information identifying a plan for an event and a plan item of the plan,
receive transaction information identifying transactions,
the transactions including an expenditure related to a purchase;
process the plan information and the transaction information to identify one or more transactions, of the transactions, related to the plan;
determine that a threshold preference for the plan item of the plan is satisfied based on a first transaction of the one or more transactions related to the plan;
wherein the threshold preference is associated with a budget associated with the plan item;
process, based on determining that the threshold preference is satisfied, information associated with the plan item, the plan information, and the transaction information, with a machine learning model, to determine one or more recommendations for the plan; and
automatically perform one or more actions based on the one or more recommendations for the plan.

18. The non-transitory computer-readable medium of claim 17, wherein the threshold preference is satisfied when the first transaction exceeds the budget associated with the plan item.

19. The non-transitory computer-readable medium of claim 17, wherein the threshold preference is set to less than the budget associated with the plan item.

20. The non-transitory computer-readable medium of claim 17, wherein the one or more actions include one or more of:
allot an amount of the plan to the plan item from another plan item of the plan;
increase an amount allotted to the plan item;
prevent future transactions associated with the plan item;
require third-party approval of the future transactions associated with the plan item;

provide directions to recommended merchants providing products and/or services associated with the plan item;
allocate an amount from another account to the plan item; or
adjust the plan item for a future time period.

\* \* \* \* \*